Nov. 5, 1968
E. W. DUNKLIN ET AL
3,409,067
MODULAR SYSTEM FOR EVAPORATIVE SEPARATION
OF SOLIDS FROM LIQUIDS
Filed Oct. 5, 1966
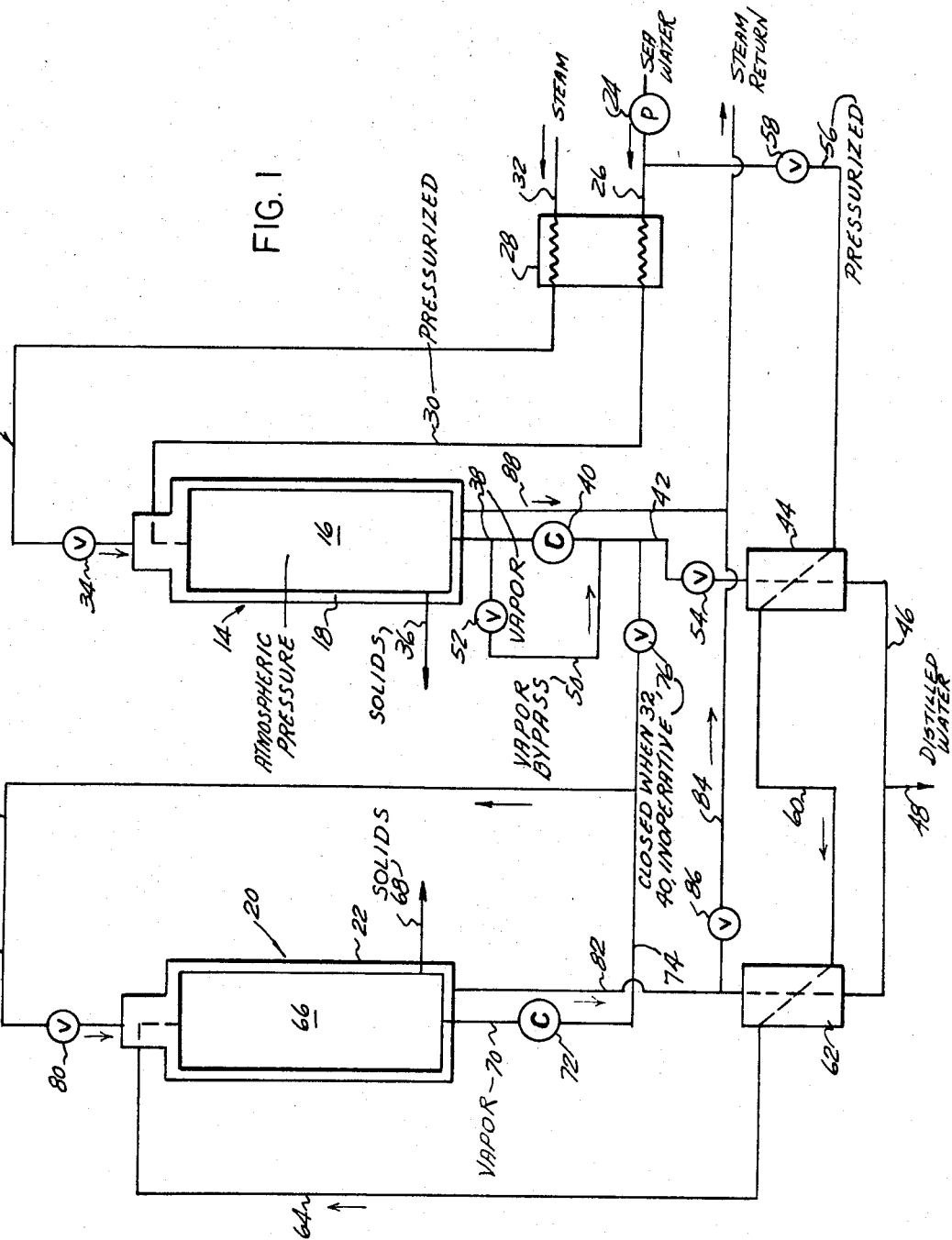
INVENTORS
EDWARD W. DUNKLIN
GERALD C. FRANCIS
Hauke, Kraus, & Gifton
BY ATTORNEYS

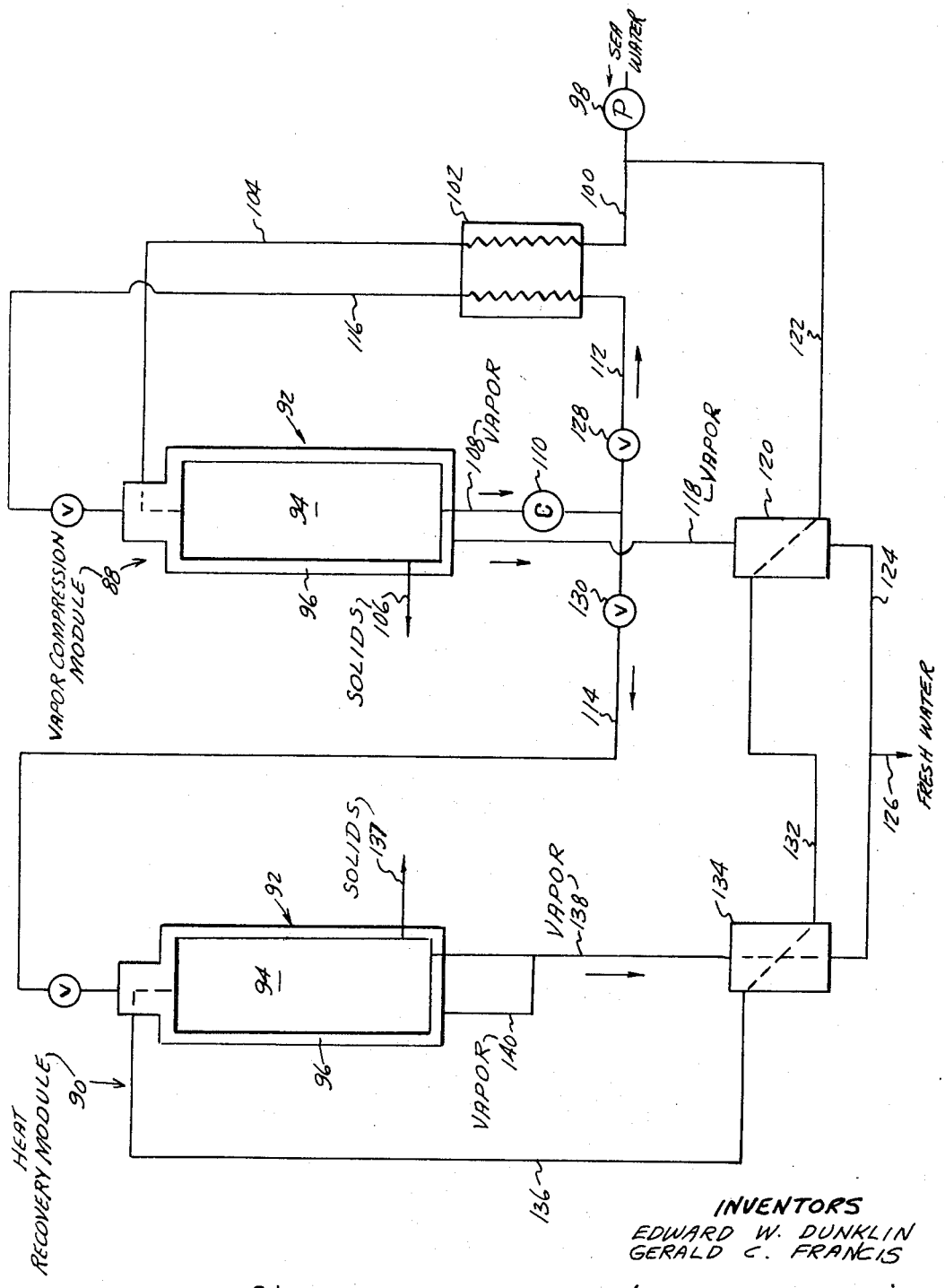

United States Patent Office 3,409,067
Patented Nov. 5, 1968

3,409,067
MODULAR SYSTEM FOR EVAPORATIVE SEPARATION OF SOLIDS FROM LIQUIDS
Edward W. Dunklin and Gerald C. Francis, both c/o Capital City Airport, Lansing, Mich.
Continuation-in-part of application Ser. No. 516,480, Dec. 27, 1965. This application Oct. 5, 1966, Ser. No. 584,499
8 Claims. (Cl. 159—20)

ABSTRACT OF THE DISCLOSURE

A separation process including a multi-unit system having in one embodiment a steam operated evaporator-separator unit and a vapor compression unit connected with the steam operated unit at startup and capable of separate operation thereafter. The second embodiment operates independently of an outside source of steam by utilizing a compressor to supply the initial heat energy as well as operational heat loss.

---

The present invention relates to the separation of dissolved solids from liquids in particular to a modular system for converting saline water to fresh water and to the purification of polluted waters. This application is a continuation-in-part of our copending patent application filed Dec. 27, 1965, Ser. No. 516,480, now abandoned.

In recent years the problem of adequate fresh water supplies to satisfy the expanding requirements of industry and the world population has steadily increased. A virtually unlimited source of fresh water lies in the oceans, however, heretofore large scale conversion of sea water to fresh water has not been economically practical due to problems related to scale, corrosion and the like which arise in conventional operations involving heat transfer.

Our aforementioned copending patent application disclosed a novel means for processing a solution having solids dissolved in a liquid for the purpose of recovering a purified liquid and concentrated solids. Although the process and associated equipment for carrying out the process may have advantages in the production of chemicals from solutions thereof, for purposes of description the process was principally described as it related to recovery of fresh from saline water.

The improved separation process achieves a high efficiency because of the phenomenon that a higher vapor pressure is obtained at a curved surface over that obtained at a flat surface. Therefore, a spherical droplet of liquid will more readily start to evaporate and as evaporation continues, the increasing curvature of the droplet surface increases the rate of evaporation until the droplet has evaporated to dryness. Based on this concept, the aforementioned patent application went on to disclose the particular advantages that could be achieved by building up a modular system comprising a series of modules each of which could be operated independently or in combination with one another in order to meet fluctuating demands, to complement a steam generating source having a fluctuating power demand and to provide certain advantages in maintainability.

It is the broad purpose of the present invention to improve modular concept disclosed in our aforementioned copending application so that systems for producing fresh water in 5–10 million gallon per day quantities are economically feasible. This improvement manifests its utility in the form of a higher heat recovery rate so that the bulk of the heat required in processing the saline water is recovered from the output products for use in processing incoming saline solution. Thus when the improved separation system is operating under a relatively stable, steady state condition, a minimum of energy in the form of heat is required from exterior sources. In comparison with the system disclosed in the aforementioned copending application, the present application contemplates a multi-unit system having no more than one of the units connected to an outside source of heat such as steam. The steam driven unit may supply the heat required to replace normal heat losses through either its steam connection or through a vapor compression process wherein the purified liquid in the form of a vapor is compressed in a manner where its energy level is raised sufficiently to maintain the continuity of the process. The other modules are preferably all vapor compressions units and may be operated either in combination with or independently of each other. Normally a vapor compression unit will be operated in combination with another unit upon startup until it has reached a steady state operational condition at which time it is run independently of the other units.

Another embodiment of the invention contemplates a modular unit completely independent of outside sources of steam as a source of heat energy. This form of the invention utilizes one or more modules operating on vapor compression. One unit of the system is adapted to operate on excess heat produced by vapor compression from the other modules and is essentially a heat recovery unit. Thus, by developing a multi-unit system which produces its own heat by vapor compression, the system is operable independent of a steam generation system.

It is therefore an object of the present invention to improve the efficiency of modular systems for recovering fresh water from saline or polluted water and which are dependent upon heat as a source of energy in the separation process by providing an improved system in which a higher percentage of heat is recovered from end products for utilization in maintaining the continuity of the system.

It is another object of the present invention to provide a modular system for distilling fresh water from sea water or polluted water by providing a plurality of units in which one unit derives its primary source of energy in the form of heat from high pressure steam and the other remaining units derive heat sufficient to maintain their continuity of operation from a vapor compression means.

It is still another object of the present invention to provide a multi-unit distillation system for recovering fresh water from saline water wherein each of the units may be operated in combination with or independently of the other units.

Still another object of the present invention is to provide a multi-unit distillation system wherein the systems heat energy is independent of an exterior steam source but is rather derived from vapor compression means.

Further objects and advantages of the present invention will readily occur to those skilled in the art to which the invention pertains upon reference to the following detailed description. The description makes reference to the accompanying drawings in which like reference characters refer to like parts throughout the views and in which:

FIGURE 1 is a schematic flow sheet of a system dependent on an outside source of steam and illustrating one preferred embodiment of the invention; and FIGURE 2 is a schematic flow sheet of a system independent of any outside source of steam and illustrating an alternate embodiment of the invention.

DESCRIPTION

Referring to the drawing, a preferred separation system is illustrated as comprising a steam driven module generally indicated at 10 and a vapor compression module generally indicated at 12. For purposes of description, the system is described with reference to a dual module system, however, the system can be scaled up to any multi-unit combination desired to meet the demands of the system.

The steam driven module 10 includes a vaporization-separation unit 14 which has a heat chamber 16 surrounded by a steam jacket 18. The vaporization-separation unit 14 also includes a conventional cyclone separator (not shown).

The vapor compression module 12 includes a vaporization-separation unit 20 having a steam jacket 22 similar to the vaporization-separation unit 14. The vaporization-separation units 14 and 20 are preferably of the type disclosed in our aforementioned co-pending application wherein sea water is heated and atomized to form droplets. The droplets are vaporized to form a solid phase and a vapor phase which are separated in the cyclone separator.

Sea water is supplied from any convenient source to a pump 24 which discharges through a conduit 26 to a heat exchanger 28. The heated sea water discharges from the heat exchanger 28 through conduit 30 to the inlet of the vaporization-separation unit 14.

High pressure steam from a generator (not shown) is introduced to the system through a conduit 32 and passes through the heat exchanger 28 to provide a source of heat to the sea water and then is delivered to the inlet of the steam jacket 18. A cutout valve 34 is provided in the conduit 32 to regulate the flow of steam introduced to the steam jacket 18.

The sea water is processed in the vaporization-separation unit 14 and separated into its constituents including the solids which are discharged through a line 36 to a bin (not shown) and a vaporized constituent which takes the form of steam. The steam is discharged through a discharged conduit 38 to a compressor 40. The compressor 40 discharges the pressurized steam through conduit 42 to a heat exchanger 44 where the steam is condensed and discharged through a condensate line 46 for delivery through a discharge conduit 48 to a collection tank (not shown) or other suitable container.

A bypass line 50 having a cutout valve 52 is operative to bypass the compressor 40. The conduit 42 also includes a cutout valve 54 which is effective to cut off the flow of liquid discharged from the compressor 40 to the heat exchanger 44.

The discharge of pressurized sea water from the pump 24 is also distributed to a conduit 56 having a cutout valve 58 to the heat exchanger 44. The temperature of the sea water passing through the heat exchanger 44 is raised by the heat of condensation from the condensing steam produced by the unit 14. The heated sea water is delivered through a conduit 60 to a heat exchanger 62 associated with the module 12. The heat content of the sea water is increased in the heat exchanger 62 and then delivered through conduit 64 to the inlet of a heated chamber 66 provided in the vaporization-separation unit 20. It is to be understood that the vaporization-separation unit 20 functions substantially the same as unit 14 and includes means for atomizing the heated sea water, vaporizing the droplets formed by the atomization step and then separating from the resultant constituents the solid end-products which are discharged through a line 68 to a suitable container (not shown) preferably common to the discharge line 36. The liquid end-product which in the preferred embodiment takes the form of vaporized fresh water is discharged through a conduit 70 to a compressor 72.

The compressor 72 discharges the pressurized steam to a conduit 74 which is fluidly connected to the conduit 42 between the compressor 40 and the valve 54. The conduit 74 includes cutout valve 76 and a recirculation conduit 78 which discharges at the inlet of the steam jacket 22. The conduit 78 also includes a cutout valve 80.

The fluid discharge from the steam jacket 22 is through a conduit 82 which normally passes in heat-exchange relationship through the heat exchanger 62 and discharges to the condensate line 46. A steam return line 84 is connected to the conduit 82 and is provided with a cutout valve 86.

The steam jacket 18 of the vaporization-separation unit 14 normally discharges through a conduit 88 to the steam return line 84.

OPERATION OF THE SYSTEM

Now it is to be understood that normally the steam driven module 10 and the vapor compression driven module 12 may be operated either in combination or independently of each other. Furthermore, the steam driven module under steady operating conditions may also operate under vapor compression rather than through steam power. For purposes of description. the system will be described by indicating the steps in starting up the steam driven module 10. When the steam driven module 10 has reached a fairly stable operating condition, then its output is utilized to start up the vapor compression driven module 12. When the vapor compression driven module 12 has reached a fairly stable operating condition, the two units are normally substantially separated in terms of operation.

Assuming sea water is supplied to the pump 24 at a temperature of 60° F. and at atmospheric pressure, its pressure is raised to about 700 p.s.i. The sea water is then passed through the heat exchanger 28 where it absorbs heat sufficient to raise its temperature to about 503° F. from the high pressure, high temperature steam passing through the conduit 32. Preferably the steam is introduced to the heat exchanger 28 at about 1000 p.s.i. and 1000° F. The heated sea water is then introduced to the vaporization-separation unit 14 where it is passed through an atomizer and sprayed into the chamber 16 at atmospheric pressure.

Normally the valve 34 is open so that the high pressure steam upon leaving heat exchanger 28 is delivered to the steam jacket 18 where it supplies heat to the droplets in the chamber 16 to assist evaporation of the droplets. Now it is to be understood that normally the pressures and temperatures of the sea water prior to being introduced to the heated chamber 16 is such as to prevent boiling of the sea water until it has been discharged from the atomizer in the form of droplets. As the droplets begin to evaporate, they begin to cool as the heat of vaporization converts the liquid to a vapor. Preferably, the steam jacket 18 supplies heat sufficient to assist the vaporization step and also to maintain the temperature of the droplets at 400° F.

The vaporization process breaks the sea water down into a solid phase and a vapor phase. The solid phase which normally constitutes a high percentage of sodium chloride has a relatively low heat capacity as compared to that of the vapor phase. Thus the greater portion of the heat supplied to the sea water in the process is retained by the vapor phase. The solid phase and the vapor phase are then introduced to a cyclone separator from which the solid phase is discharged to the line 36.

The purified vapor phase is passed to the compressor 40 wherein its energy level is increased as it is compressed to 60 p.s.i. and its temperature increased to 500° F. which is in the superheat range. Normally, if the steam driven module 10 is to be operated by itself, and steam is delivered to the system from the high pressure, high temperature source through the conduit 32, the compressor 40 will be inactivated and the discharge from the cyclone separator will be delivered through the open valve 52 and the conduit 50 bypassing the compressor and discharging through the open valve 54 to the heat exchanger 44 and the condensate line 46.

For purposes of description it is assumed that the vapor compression driven module 12 is to be activated by excess heat supplied from module 10. The pressurized vapor discharged from the compressor 40 is delivered through the conduit 42 to the conduit 74 and the open valve 76 to the conduit 78 and the open valve 80 for introduction to the steam jacket 22 of the vaporization-separation unit 20. The vapor transfers its superheat to the chamber 66 and is partially condensed to its saturation temperature of about 293° F. The partially condensed steam is then discharged through the conduit 82 to the heat exchanger 62 into the condensate line 46.

In starting the module 12, the pressurized sea water is delivered from the pump 24 through the conduit 56 and the open valve 58 where its heat content is increased as it passes through the heat exchanger 44 and further increased as it is delivered by conduit 60 through the heat exchanger 62. The heated sea water leaves the heat exchanger 62 and is delivered by conduit 64 to the chamber 66 wherein it is atomized to form droplets which are vaporized. The heat of vaporization is supplied by the steam from unit 14 which is passing through the steam jacket 22. The products of vaporization include the solid end-products such as sodium chloride which are discharged through the conduit 68 and the vapor phase of the sea water which is discharged through the conduit 70 to the compressor 72. The compressor 72 raises the pressure of the vapor phase from about 5 p.s.i. and 230° F. in the chamber 66 to about 45 p.s.i. and 445° F. The pressurized vapor is then in a superheated condition and is discharged to the conduit 74 for delivery to conduit 78 which introduces it to the steam jacket 22 wherein it passes in heat exchange relationship with the incoming sea water. The vapor is partially condensed by giving up some of its heat content and its temperature reduced to its saturation temperature of about 290° F. The partially condensed steam is then passed in heat exchange relationship to the incoming sea water in the heat exchanger 62 from whence it is discharged to the condensate line 46 to combine with the output of the module 10.

When the vaporization-separation unit 22 has reached a relatively stable operating condition, the valve 76 is closed to separate the two systems and the output of the vaporization-separation unit 18 directed to the heat exchanger 44 by opening the valve 54. The compressor 40 is inactivated and the output of the steam jacket 18 delivered through the open valve 52 and the bypass line 50. Thus it can be seen that when the modules 10 and 12 are operating independently of one another that the inherent heat losses of the module 10 may be replenished through either the high pressure steam delivered through the conduit 32 or by operating the compressor 40. The inherent heat losses of the module 12 are replenished through the compressor 72, however the bulk of the heat in the module 12 is retained therein as substantially most of the heat utilized in the separation process is recovered from the end-products and recycled back into the incoming sea water.

It is to be understood, of course, that the system could comprise a third, fourth or as many units as are desirable and the units activated sequentially, by diverting the excess energy from the module 10 to an inactive module for time sufficient for the inactive module to become self-sustaining.

VAPOR COMPRESSION SYSTEM

FIGURE 2 illustrates a multi-unit system independent of an outside source of steam. The system is similar to the combination illustrated in FIGURE 1 including a vapor compression module 88 and a heat recovery module 90.

Both modules include a vaporization-separation unit 92 having a heat chamber 94 surrounded by a steam jacket 96 and including a cyclone separator (not shown).

Vaporization-separation units 92 operate in the same manner as units 14 and 20 described with reference to the system illustrated in FIGURE 1.

Sea water is supplied to a pump 98 which discharges through a conduit 100 to a heat exchanger 102 where it is heated to a temperature of about 396° F. The heated sea water is delivered from the heat exchanger 102 by a conduit 104 to the inlet of the vaporization-separation unit 92 associated with the vapor compression module 88.

The sea water is processed to yield a dry solid which is discharged through outlet 106 to a conveyor (not shown) and vaporized fresh water which is delivered through a conduit 108 to a compressor 110.

The pressurized output of compressor 110 is discharged to heat exchanger 102 through a conduit 112 and to the heat recovery module 90 through a conduit 114.

The pressurized vapor delivered to heat exchanger 102 passes in heat exchange relationship with the incoming sea water and gives up part of its heat energy before flowing through conduit 116 where it is delivered to the steam jacket 96 of the vapor compression vaporization-separation unit 94. The vaporized fresh water gives up heat in the steam jacket 96 to assist in superheating the vapor in chamber 94 and in drying the solid end-products. The vapor then discharges through conduit 118 to preheater 120 where the vapor is condensed by passing in heat exchange relationship to incoming sea water being delivered through a conduit 122 to the heat recovery module 90. The condensed fresh water discharges through conduit 124 to outlet 126.

It can be seen that the compressor 110 has a capacity such that it supplies heat energy sufficient to maintain continual operation of the vapor compression unit 88. Conduit 112 is provided with a metering valve 128 which is adjusted so that when sufficient heat is being supplied to vapor compression unit 88, the excess heat energy resulting from compressor 110 is diverted through conduit 114 to the heat recovery unit 90. Conduit 114 has a cutout valve 130 which permits separation of the units for the purpose of maintainability.

Sea water for the heat recovery module 90 is first heated in pre-heater 120, delivered through a conduit 132 to a second pre-heater 134 and then delivered through conduit 136 to the inlet of vaporization-separator unit 92 of heat recovery module 90 where it is broken down into its solid and vapor constituents in the manner heretofore set forth.

The dry solid products of the heat recovery unit 90 are discharged through outlet 137 to a conveyor (not shown) and vaporized fresh water is discharged through conduit 138 which passes in heat exchange relationship through pre-heater 134 wherein it is condensed for delivery to the outlet conduit 124. The vaporized product water from the vapor compression module 88, after contributing its heat energy to the breakdown of the sea water in the heat recovery module 90, is discharged from the steam jacket 96 through conduit 140 where it combines with the product vapor of the heat recovery module 90.

Thus the multi-unit system illustrated in FIGURE 2 represents a system for distilling sea water to produce fresh water independently of an outside source of steam. It further illustrates a heat recovery vaporization-separation unit intended to operate on the excess heat produced by the compression means in a vapor compression module. Normally one heat recovery unit will accommodate a plurality of vapor compression modules.

Although we have described and illustrated two embodiments of the present invention, it will be apparent to one skilled in the art to which the invention pertains that various changes and modifications may be made therein without departing from the spirit of the invention as expressed in the scope of the appended claims.

I claim:
1. A process for separating dissolved solids from a solution of the solids and a liquid comprising the steps of:
 (a) heating a first solution at a controlled pressure to a temperature below the boiling point of the solution;
 (b) atomizing said first solution into a first chamber having a pressure less than the vapor pressure of the liquid, the atomization forming droplets of the solution to assist vaporization of the liquid to form a first solid phase of dry solid particles suspended in a first vapor phase of vaporized liquid;
(c) separating the first solid phase from the first vapor phase;
(d) pressurizing said first vapor phase to raise its heat content;
(e) passing said first pressurized vapor phase in indirect heat exchange relationship with a second solution at a controlled pressure, to raise the temperature of said second solution to a temperature below its boiling point;
(f) atomizing said second solution into a second chamber having a pressure less than that of the vapor pressure of the liquid of said second solution, the atomization forming droplets to assist vaporization of said second solution to form a second solid phase of dry solid particles suspended in a second vapor phase of